United States Patent
Tsuchida et al.

(10) Patent No.: US 12,204,979 B2
(45) Date of Patent: Jan. 21, 2025

(54) WIRELESS TAG COMMUNICATION DEVICE

(71) Applicant: TOSHIBA TEC KABUSHIKI KAISHA, Tokyo (JP)

(72) Inventors: Sunao Tsuchida, Mishima Shizuoka (JP); Sadatoshi Oishi, Fuji Shizuoka (JP); Jun Yaginuma, Izunokuni Shizuoka (JP)

(73) Assignee: TOSHIBA TEC KABUSHIKI KAISHA, Tokyo (JP)

( * ) Notice: Subject to any disclaimer, the term of this patent is extended or adjusted under 35 U.S.C. 154(b) by 195 days.

(21) Appl. No.: 17/889,917

(22) Filed: Aug. 17, 2022

(65) Prior Publication Data

US 2023/0144063 A1    May 11, 2023

(30) Foreign Application Priority Data

Nov. 9, 2021 (JP) ................... 2021-182418

(51) Int. Cl.
*G06K 7/10* (2006.01)
*G08B 7/06* (2006.01)
*H04B 17/318* (2015.01)

(52) U.S. Cl.
CPC ..... *G06K 7/10099* (2013.01); *G06K 7/10386* (2013.01); *G08B 7/06* (2013.01); *H04B 17/318* (2015.01)

(58) Field of Classification Search
CPC ........... G06K 7/10099; G06K 7/10386; G08B 7/06; H04B 17/318
See application file for complete search history.

(56) References Cited

U.S. PATENT DOCUMENTS

| | | | |
|---|---|---|---|
| 10,765,007 B2 * | 9/2020 | Bae | G01S 5/14 |
| 2010/0141395 A1 * | 6/2010 | Nagai | H04B 5/77 340/10.4 |
| 2013/0093569 A1 | 4/2013 | Sano et al. | |
| 2014/0203916 A1 * | 7/2014 | Sano | G06K 7/10089 340/10.6 |
| 2015/0035651 A1 * | 2/2015 | Tsuchida | G06K 7/10089 340/10.5 |
| 2018/0003812 A1 * | 1/2018 | Kamiya | G06K 7/10 |
| 2020/0209348 A1 * | 7/2020 | Koch | G01S 13/876 |

FOREIGN PATENT DOCUMENTS

| | | | |
|---|---|---|---|
| JP | 2007-088743 A | | 4/2007 |
| JP | 2010009382 A | * | 1/2010 |
| JP | 2011-237941 A | | 11/2011 |

* cited by examiner

*Primary Examiner* — Mohamed Barakat
(74) *Attorney, Agent, or Firm* — FOLEY & LARDNER LLP

(57) ABSTRACT

A wireless tag communication device includes a communication control circuit, a sensor, and a processor. The communication control circuit is configured to communicate with a wireless tag via an antenna. The sensor is configured to detect a variation amount of a direction of the antenna. The processor is configured to output an alert when the variation amount of the direction of the antenna detected by the sensor is less than a reference value.

16 Claims, 7 Drawing Sheets

WIRELESS TAG COMMUNICATION DEVICE

CROSS-REFERENCE TO RELATED APPLICATION

This application is based upon and claims the benefit of priority from Japanese Patent Application No. 2021-182418, filed on Nov. 9, 2021, the entire contents of which are incorporated herein by reference.

FIELD

Embodiments described herein relate generally to a wireless tag communication device.

BACKGROUND

In the related art, there is a wireless tag communication device for reading an RFID tag (hereinafter, also referred to as a wireless tag) at an unspecified position. The wireless tag communication device communicates with a specific RFID tag while changing the direction of an antenna by the operation of an operator. The wireless tag communication device notifies the operator of information indicating a position where the specific RFID tag is present, which is estimated based on the communication state with the specific RFID tag.

DETAILED DESCRIPTION

The wireless tag communication device described above is required to change the direction of the antenna by an operation of the operator in order to estimate a position where the specific RFID tag is present. However, there is a problem in that the operator may not know how to operate the wireless tag communication device in the related art in order to appropriately change the direction of the antenna.

In order to solve the above problem, an object is to provide a wireless tag communication device capable of guiding an operator to perform an appropriate operation.

In general, according to at least one embodiment, a wireless tag communication device includes a communication control circuit, a sensor, and a processor. The communication control circuit communicates with a wireless tag via an antenna. The sensor detects a variation amount of a direction of the antenna. The processor outputs an alert if the variation amount of the direction of the antenna detected by the sensor is less than a reference value.

Hereinafter, embodiments are described with reference to the drawings.

First, a configuration of a wireless tag reading device (wireless tag communication device) 10 according to at least one embodiment is described.

Figure 1:
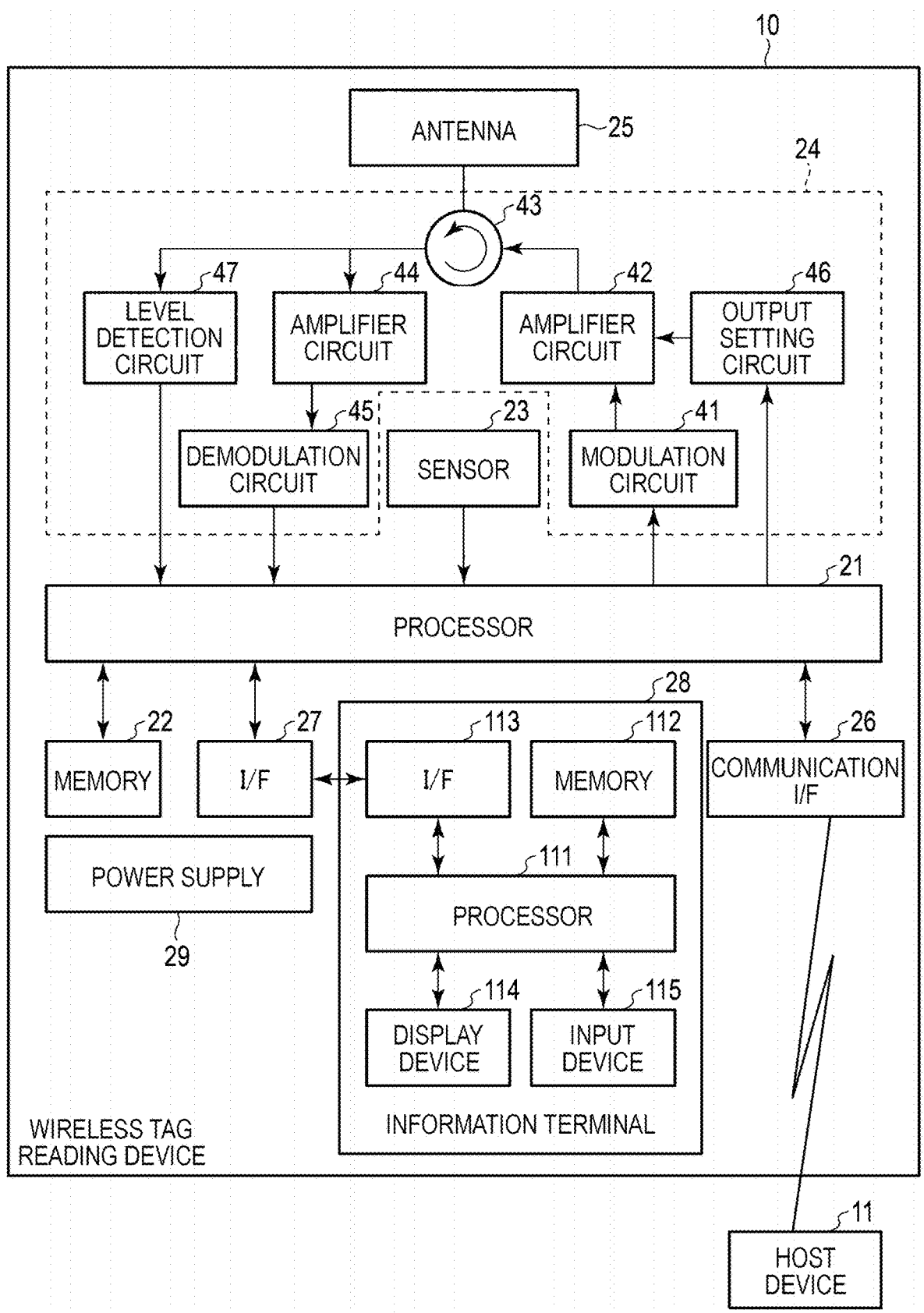
FIG. 1 is a block diagram schematically illustrating a configuration example of a control system in a wireless tag reading device according to at least one embodiment.

FIG. 1 is a block diagram schematically illustrating a configuration example of the wireless tag reading device 10 according to the embodiment.

The wireless tag reading device 10 according to the embodiment is a wireless tag communication device that communicates with a radio frequency identification (RFID) tag (e.g., wireless tag). The wireless tag reading device 10 reads tag information or the like recorded in the RFID tag by communicating with the RFID tag. The wireless tag reading device 10 estimates information relating to a position such as a direction or a distance where the RFID tag is present from the reading result of the RFID tag. The wireless tag reading device 10 notifies an operator of the information (e.g., direction or distance) relating to the position where the RFID tag is present, which is estimated from the reading result.

The RFID tag is a wireless communication device that is operated by radio waves (e.g., output signals) from the wireless tag reading device 10. The RFID tag includes a processor, a memory, a communication circuit, an antenna, and the like. The RFID tag outputs a response signal including tag information recorded in the memory of the RFID tag in response to a read command from the wireless tag reading device 10. For example, the RFID tag is attached to goods such as merchandises or components. With respect to the RFID tag attached to the goods, tag information including information for specifying the corresponding goods is recorded in the internal memory.

The wireless tag reading device 10 according to the embodiment is operated by the operator. The wireless tag reading device 10 is a device that changes a direction of an antenna 25 used to communicate with the RFID tag by the operation of the operator. For example, the wireless tag reading device 10 is a handy-type device that is held by the operator with the hands and operated. In addition, the wireless tag reading device 10 may be mounted on a moving body with which the operator operates the direction of the antenna.

The wireless tag reading device 10 according to the embodiment reads the RFID tag attached to the goods while changing the position and the direction of the antenna by the operation of the operator. The wireless tag reading device 10 reads the tag information recorded in the RFID tag by receiving the response signal from the RFID tag that is present in the reading area. The wireless tag reading device 10 acquires information such as a received signal strength indicator (RSSI) value indicating the intensity of the reception signal received from the RFID tag together with the tag information as the reading result of the RFID tag.

For example, the wireless tag reading device 10 operates as a search device for searching for goods to which an RFID tag is attached in a predetermined region such as a warehouse or a store. The wireless tag reading device 10 as the search device continuously reads an RFID tag as a search target while changing the position and the direction of the antenna by the operation of the operator. The wireless tag reading device 10 estimates the position (such as the direction or the distance) where the RFID tag is present based on the reading result of the RFID tag as the search target. In addition, the wireless tag reading device 10 may estimate the change of the relative position to the RFID tag based on the change of the intensity of the reception signal in time series. The wireless tag reading device 10 notifies the operator of the information such as the direction in which the RFID tag is present or the distance to the RFID tag, which is estimated from the reading result.

In the configuration example illustrated in FIG. 1, the wireless tag reading device 10 includes a processor 21, a memory 22, a sensor 23, a communication control circuit 24, the antenna 25, a communication interface (I/F) 26, an interface 27, an information terminal 28, and a power supply 29.

The processor 21 controls each unit. The processor 21 includes, for example, an arithmetic circuit such as a central processing unit (CPU). The processor 21 implements the control of each unit and various data processes by executing programs. In addition, the processor 21 may include an internal memory.

The processor 21 performs various processes by executing the programs stored in the memory 22 or the like. For example, the processor 21 interprets a command from a host device 11 received by the communication I/F 26 and performs the process in response to the command.

The memory 22 includes various memories. For example, the memory 22 includes a memory such as a read-only memory (ROM), a random access memory (RAM), and a non-volatile memory (NVM). The ROM is a non-volatile memory on which rewriting cannot be performed. The ROM stores a program or the like that is executed by the processor 21. The RAM is a volatile memory that temporarily stores data. The RAM is operated as a working memory or a buffer memory. The NVM is a non-volatile memory on which rewriting can be performed. The NVM stores information such as a program, control information, setting information, and a reading result.

The sensor 23 detects the movement of the corresponding wireless tag reading device 10. The sensor 23 includes a sensor that detects the change in the direction of the antenna 25 provided in the wireless tag reading device 10. For example, the sensor 23 is an acceleration sensor, a gyro sensor, a geomagnetic (direction) sensor, or the like. The sensor 23 may be configured to include a plurality of types of sensors. In addition, the sensor 23 may be provided in the information terminal 28.

The communication control circuit 24 and the antenna 25 form an RFID interface that communicates with the RFID tag.

The communication control circuit 24 includes a control circuit for communicating with the RFID tag via the antenna 25. The communication control circuit 24 causes the antenna 25 to transmit a transmission signal (e.g., radio wave) supplied from the processor 21 at a set output value. The antenna 25 outputs the transmission signal supplied from the communication control circuit 24 as the radio wave that the RFID tag can receive.

The communication control circuit 24 not only outputs the transmission signal to the antenna 25 but also supplies a signal received by the antenna 25 to the processor 21 as the received data. That is, the communication control circuit 24 receives the response signal from the RFID tag by the antenna 25 and processes and supplies the response signal (e.g., reception signal) received by the antenna 25 to the processor 21. For example, the communication control circuit 24 supplies the tag information included in the reception signal from the RFID tag and the RSSI value indicating the intensity of the corresponding reception signal to the processor 21.

The communication I/F 26 is an interface for communicating with the external device. The communication I/F 26 is a communication interface for communicating with the host device 11 such as the server. The communication I/F 26 may be an interface for wired communication and may be an interface for wireless communication.

The interface 27 is an interface for connecting to the information terminal 28. The interface 27 may correspond to an interface included in the information terminal 28. For example, the interface 27 is physically in contact with and is connected to the interface included in the information terminal 28 such as a universal serial bus (USB) interface or a local area network (LAN) interface. In addition, the interface 27 may perform wireless communication connection such as the Bluetooth (registered trademark) interface or a WiFi interface.

The information terminal 28 is a device including a display device 114, an input device 115, and the like. The information terminal 28 is operated as a user interface as a display device and an input device in the wireless tag reading device 10. The information terminal 28 may be, for example, a portable information processing device such as a smart phone or a tablet personal computer (PC).

In the configuration example illustrated in FIG. 1, the information terminal 28 includes a processor 111, a memory 112, an interface (I/F) 113, the display device 114, the input device 115, and the like.

The processor 111 controls each unit and performs data processing. The processor 111 is, for example, a CPU. The processor 111 implements various operations by performing the program stored in the memory 112.

The interface 113 is an interface (e.g., second communication interface) for communication with the processor 21. The interface 113 may correspond to the interface 27. For example, the interface 113 is an interface such as LAN, USB, Bluetooth (registered trademark), or WiFi.

The display device 114 is a device that displays information. For example, the display device 114 displays detection result (for example, the position of the RFID tag) or the like of the RFID tag. The input device 115 is a device for the operator to input the operation instruction. The display device 114 and the input device 115 are configured, for example, with a display device with a touch panel.

The power supply 29 supplies the power supply electric power for operating the wireless tag reading device 10. The power supply 29 supplies the electric power for operation to each unit of the wireless tag reading device 10. In the handy-type wireless tag reading device 10, the power supply 29 is configured, for example, with a rechargeable battery.

Subsequently, the configuration example of the communication control circuit 24 in the wireless tag reading device 10 according to the embodiment is described.

As illustrated in FIG. 1, the communication control circuit 24 includes a modulation circuit 41, an amplification circuit 42, a coupler 43, an amplification circuit 44, a demodulation circuit 45, an output setting circuit 46, a level detection circuit 47 and the like. By the configuration example illustrated in FIG. 1, the communication control circuit 24 processes the signals transmitted to the RFID tag and signals received from the RFID tag via the antenna 25.

The modulation circuit 41 is a circuit that modulates the waveform signal (e.g., carrier wave) with the input data. The modulation circuit 41 modulates the carrier waves with the transmission data given from the processor 21. The amplification circuit 42 is an amplification circuit on the transmission side that amplifies the input signal. The amplification circuit 42 amplifies the output signal of the modulation circuit 41. The coupler 43 includes a circuit that supplies the output signal of the amplification circuit 42 to the antenna 25. According to these configurations, the communication control circuit 24 outputs the carrier waves modulated with the transmission data from the antenna 25.

The RFID tag receives the radio wave as the transmission signal transmitted from the antenna 25. For example, the RFID tag recognizes the read command included in the transmission signal transmitted from the antenna 25. If the read command is recognized, the RFID tag outputs the data (e.g., tag information) stored in the memory of the own device, for example, by backscatter modulation as the radio waves.

The antenna 25 receives the radio waves as the reception signals output by the RFID tag. The coupler 43 is a circuit that acquires the reception signals received by the antenna 25 and supplies the acquired reception signals to the amplification circuit 44. The coupler 43 is, for example, a directional coupler or an isolator. The amplification circuit 44 is an amplification circuit on the reception side that amplifies the input signal. The amplification circuit 44 amplifies the reception signal received by the antenna 25. The demodulation circuit 45 is a circuit that demodulates the data overlapped with the waveform signals (e.g., carrier waves). The demodulation circuit 45 demodulates the data (e.g., tag information) included in the reception signal that is amplified by the amplification circuit 44.

The antenna 25 may transmit and receive the radio waves for the communication with the RFID tag. The antenna 25 may transmit the transmission signals that are supplied to the RFID tag and receive the radio waves output by the RFID tag as the reception signals. According to the present embodiment, the antenna 25 has directivity. The antenna 25 is disposed so as to transmit an electromagnetic wave toward a reading area having a center thereof in the direction in which the directivity is the strongest (a direction a shown in FIG. 2). The wireless tag reading device 10 is configured to communicate with the RFID tags attached to all merchandises arranged in the reading area via the antenna 25. The antenna 25 is, for example, a planar antenna. However, the antenna 25 is not limited to the specific configuration.

The output setting circuit 46 is a circuit that sets the intensity (e.g., output value) of the output signal. The output setting circuit 46 controls the amplification circuit 42 so that the intensity of the output signal has a set output value. The amplification circuit 42 amplifies the signal supplied from the modulation circuit 41 to be the output value set by the output setting circuit 46 and outputs the signal to the coupler 43. Accordingly, the antenna 25 transmits the output signals (e.g., radio waves) having the output value set by the output setting circuit 46 which is supplied from the amplification circuit 42 via the coupler 43.

The level detection circuit 47 is a circuit that detects (e.g., measures) the intensity of a signal. The level detection circuit 47 detects the intensity of the signal input to the amplification circuit 44. The reception signal received by the antenna 25 is input to the amplification circuit 44 via the coupler 43. That is, the level detection circuit 47 detects the information for specifying the RSSI value indicating the intensity of the reception signal (e.g., the response signal from the RFID tag) received by the antenna 25.

Subsequently, the operation example of the wireless tag reading device 10 according to the embodiment is described.

Figure 2:
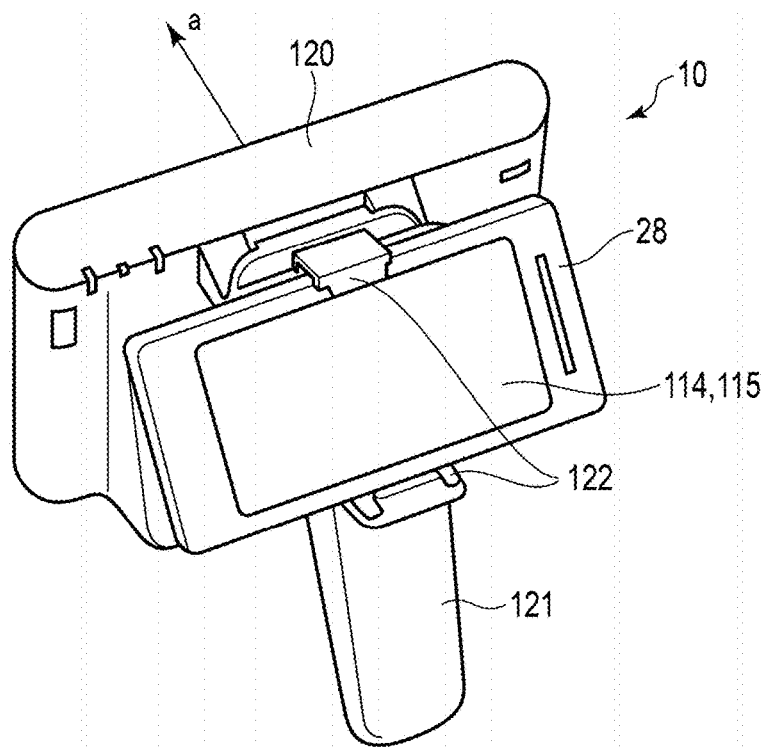
FIG. 2 is an external view illustrating a configuration example of an external appearance in the wireless tag reading device.

FIG. 2 is a diagram illustrating an external appearance configuration example of the wireless tag reading device 10 according to the embodiment.

The wireless tag reading device 10 illustrated in FIG. 2 is a handy-type device that is operated in a state of being gripped by the operator. The wireless tag reading device 10 illustrated in FIG. 2 operates as a search device that searches, for example, for an RFID tag or for goods to which the RFID tag is attached.

In the configuration example illustrated in FIG. 2, the wireless tag reading device 10 is configured to be operated in a state in which the information terminal 28 is set to a reader device (e.g., base device) 120. The reader device 120 is a device including each configuration illustrated in FIG. 1 excluding the information terminal 28. The reader device 120 includes a housing to which the antenna 25 is installed. For example, in the reader device 120, the antenna 25 is provided so that the directivity is the strongest in the direction of the arrow a illustrated in FIG. 2. Here, the direction of the arrow a is the front (e.g., forward) direction of the wireless tag reading device 10. In addition, the front direction of the wireless tag reading device 10 is the direction of the antenna 25.

In addition to the configuration of the control system illustrated in FIG. 1, the reader device 120 includes a grip portion 121 and a holding portion 122. The grip portion 121 is a portion that the operator grips. The holding portion 122 is configured with a tool for holding the information terminal 28. The holding portion 122 holds the information terminal 28 so that the display screen of the display device 114 faces the operator who grips the grip portion 121. The wireless tag reading device 10 is operated by the operator who grips the grip portion 121 in a state in which the information terminal 28 is set to the holding portion 122.

The wireless tag reading device 10 is moved by being held by the operator with a hand in a state in which the information terminal 28 is set. The wireless tag reading device 10 continuously reads the RFID tag while being operated by the operator. For example, the operator who grips the grip portion 121 changes the direction of the antenna 25 provided to the reader device 120. The wireless tag reading device 10 detects the change in the direction of the antenna 25 caused by the operation of the operator with the sensor 23. The wireless tag reading device 10 reads the RFID tag while detecting the change in the direction of the antenna.

The wireless tag reading device 10 stores the reading result obtained by repeatedly reading the specific RFID tag while changing the direction of the antenna 25 in response to the operation of the operator. For example, the wireless tag reading device 10 acquires the reading result obtained by reading the specific RFID tag while changing the direction of the antenna 25. The wireless tag reading device 10 acquires the information such as the RSSI value indicating the intensity of the signal received from the RFID tag as the reading result, in addition to the tag information acquired from the RFID tag. In addition, the wireless tag reading device 10 also acquires the information or the like indicating the change amount of the direction detected by the sensor 23, as the reading result.

The wireless tag reading device 10 estimates the direction (e.g., tag direction) in which the RFID tag is present from the reading result of the RFID tag. For example, the wireless tag reading device 10 estimates the median value of the ranges of the directions (e.g., the directions of the antenna) in which the specific RFID tag is read, as the tag direction in which the corresponding RFID tag is present. In addition, the wireless tag reading device 10 may estimate the direction (e.g., the direction of the antenna) in which the RSSI value becomes the maximum from the reading result obtained by reading the specific RFID tag as the tag direction in which the corresponding RFID tag is present.

The wireless tag reading device 10 detects the change in the direction of the antenna 25 by the sensor 23. If the change amount of the direction of the antenna 25 that is detected by the sensor 23 is the reference value or less, the wireless tag reading device 10 notifies an alert prompting the operation of changing the direction of the antenna 25. For example, if the change in the direction of the antenna 25 is the reference value or less, the wireless tag reading device 10 displays the operation guidance of prompting the operation of changing the direction of the antenna 25 on the display device 114.

Figure 3:
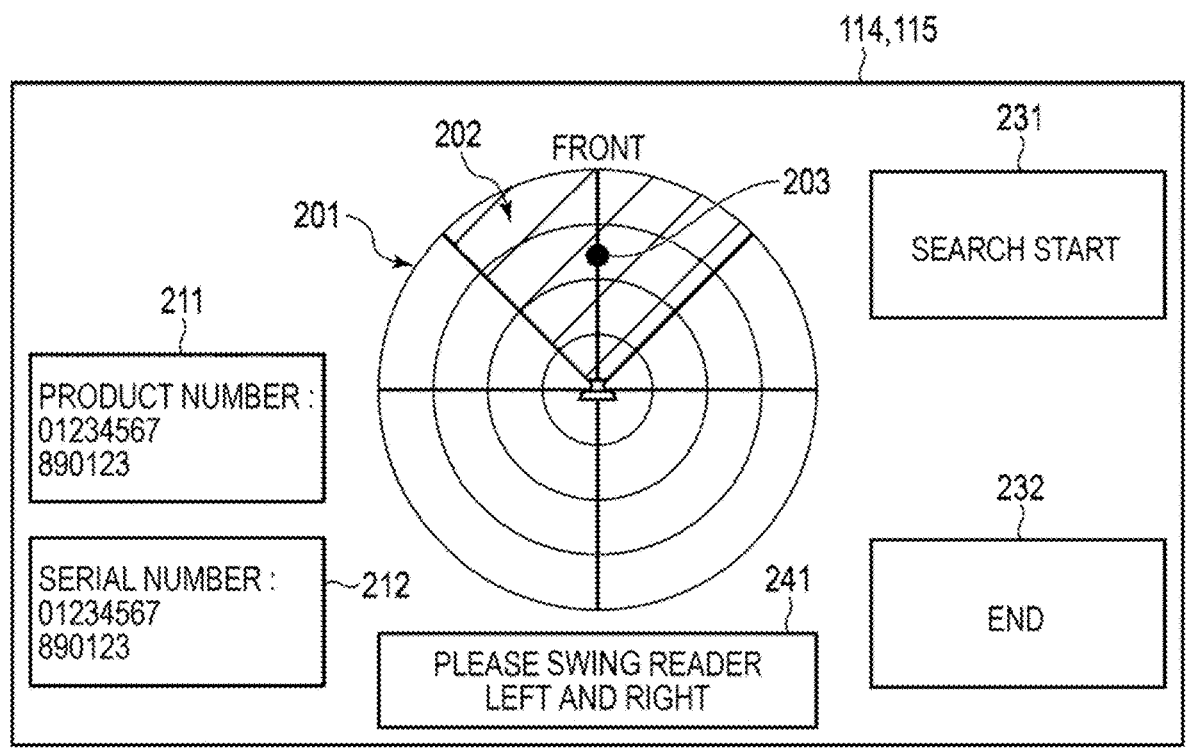
FIG. 3 is a diagram illustrating a display example of an operation guidance displayed while the wireless tag reading device is in operation in a search mode of an RFID tag.

FIG. 3 is a diagram illustrating the display example of the operation guidance displayed on the display device 114 by the wireless tag reading device 10.

The display example illustrated in FIG. 3 is an example in which the operation guidance is displayed on the display screen that displays the search result of the RFID tag.

In the search mode for searching for the specific RFID tag, the wireless tag reading device 10 displays the display screen for displaying the search result of the RFID tag illustrated in FIG. 3 on the display device 114. In the search mode, the wireless tag reading device estimates the position (e.g., the direction and the distance) where the specific RFID tag is present from the reading result of the RFID tag. The wireless tag reading device 10 displays the information indicating the position of the specific RFID tag that is estimated from the reading result of the RFID tag on the display device 114, as the search result.

In the display example illustrated in FIG. 3, the display device 114 displays a reading area 202 read by the wireless tag reading device 10 in a concentric circle 201 about the position of the wireless tag reading device 10, in an overlapping manner. For example, the display device 114 displays the reading area 202 on the concentric circle 201 so that the upper portion becomes the forward direction (e.g., the direction of the arrow a illustrated in FIG. 2) of the wireless tag reading device 10. The display device 114 displays a mark 203 indicating the position of the RFID tag read in the reading area 202 on the concentric circle 201.

For example, the wireless tag reading device 10 estimates the distance from the wireless tag reading device 10 to the RFID tag based on the RSSI value and the like included in the reading result of the RFID tag. The display device 114 displays the mark 203 at the position corresponding to the estimated direction and distance on the concentric circle 201 about the position of the wireless tag reading device 10. Accordingly, the display device 114 can notify the operator of the direction and the distance where the RFID tag is present by displaying the mark 203 on the reading area 202.

In addition, in the display example illustrated in FIG. 3, the display device 114 displays a display field 211, a display field 212, a search start button 231, and a completion button 232.

The display field 211 displays the product number of the RFID tag as the search target. The display field 212 displays a serial number of the RFID tag as the search target.

The search start button 231 and the completion button 232 are buttons that enables the operator to make instruction with the touch panel as the input device 115. The search start button 231 is a button used by the operator to instruct the search start of the RFID tag. The completion button 232 is a button used by the operator to instruct the completion of the search for the RFID tag. The operator can search for the RFID tag by the operation of the wireless tag reading device 10 while looking at the screen illustrated in FIG. 3.

Further, in the display example illustrated in FIG. 3, the display device 114 displays the operation guidance for prompting the operation of the wireless tag reading device 10 in a display field 241. For the search for the RFID tag, the wireless tag reading device 10 is required to perform the reading of the RFID tag while changing the direction of the antenna 25. The wireless tag reading device 10 according to the embodiment notifies the alert prompting the operation of changing the direction of the antenna 25. The operation guidance displayed in the display field 241 illustrated in FIG. 3 is an example of the alert prompting the operation of changing the direction of the antenna.

For example, if the variation amount of the direction of the antenna 25 (or the base device 120 including the antenna 25) is the predetermined threshold value or less, the wireless tag reading device 10 displays the operation guidance for prompting the operation of changing the direction of the antenna 25 on the display device 114. If the search mode is in operation, the wireless tag reading device 10 displays the display field 241 indicating the operation guidance on the display screen as illustrated in FIG. 3. In the example illustrated in FIG. 3, the wireless tag reading device 10 displays "Please swing the reader (wireless tag reading device) left and right" in the display field 241.

Subsequently, the operation of the wireless tag reading device 10 according to the embodiment is described.

Figure 4:
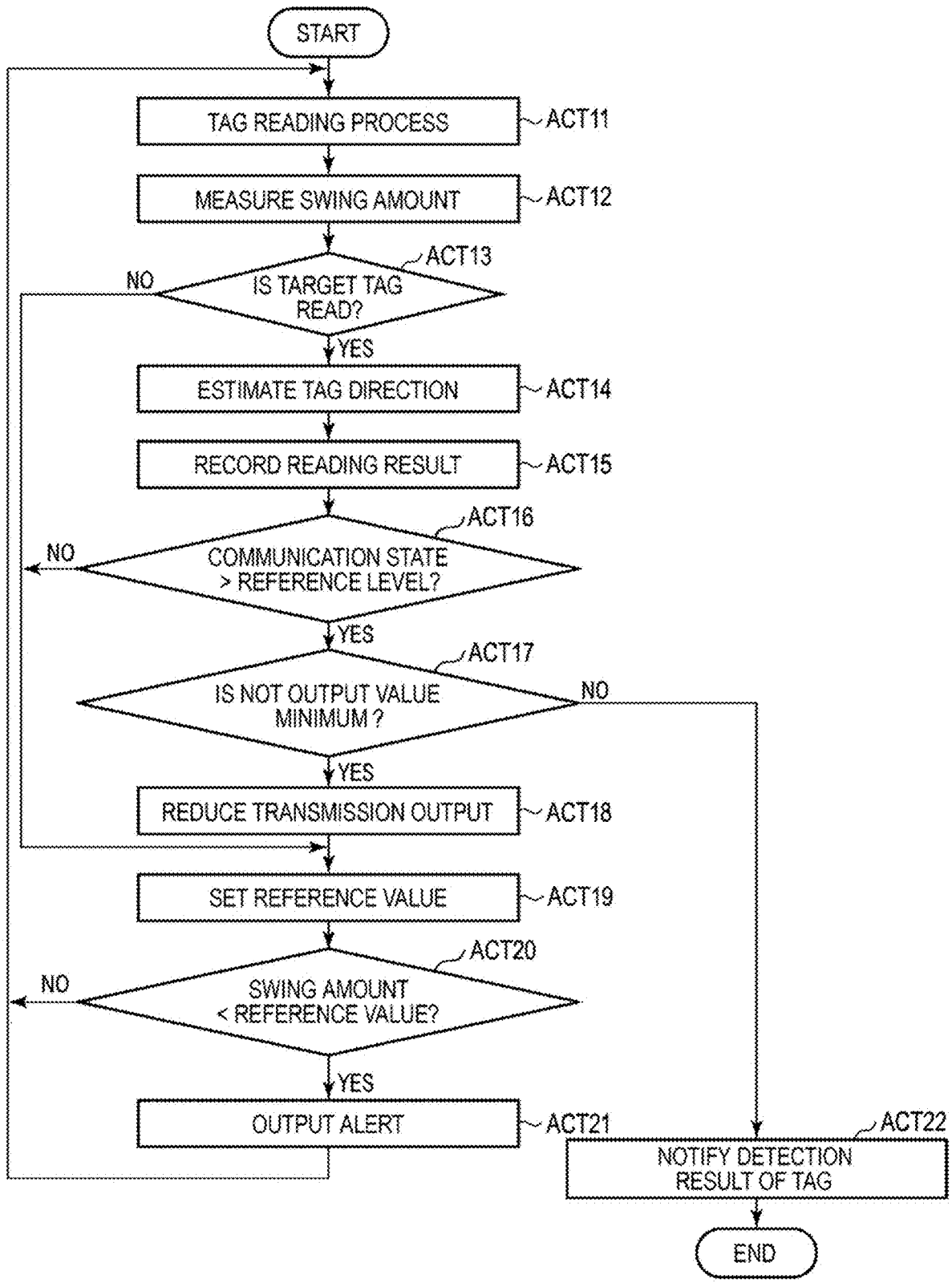
FIG. 4 is a flowchart illustrating a first operation example for the wireless tag reading device.

FIG. 4 is a flowchart illustrating a first operation example of the wireless tag reading device 10 according to the embodiment.

The processor 21 of the wireless tag reading device 10 is operated in the search mode by the operation of the operator. The processor 21 receives the setting of the RFID tag for which the operator desires to search. After the RFID tag as the search target is set, the processor 21 receives the instruction of the search start by the operator. For example, the processor 21 receives the instruction of the search start by the search start button 231 on the display screen as illustrated in FIG. 3 which is displayed on the display device 114.

The processor 21 of the wireless tag reading device 10 performs an RFID tag reading process in response to the instruction of the search start by the operator (ACT 11). The processor 21 stores the reading result of the RFID tag that is in the reading area (e.g., communication area) by the communication control circuit 24 and the antenna 25 in the memory 22.

As the reading result of each RFID tag, the processor 21 stores, for example, information such as tag information, direction (e.g., reading direction), the output value, and the RSSI value, in the memory 22.

The tag information is information output by the RFID tag in response to the response request (e.g., read command) from the wireless tag reading device 10. The tag information is configured, for example, with a header, a merchandise code, and a serial number. The header is information indicating a format of the tag information or a range of the merchandise code in the tag information. The merchandise code is information for specifying the merchandise (e.g., goods). The serial number is an identification number attached to each merchandise.

The direction (e.g., reading direction) is information indicating the direction (e.g., the direction of the wireless tag reading device 10) of the antenna 25 if the RFID tag is read. The processor 21 acquires the information indicating the direction of the antenna 25 that is detected by the sensor 23. For example, the processor 21 acquires the information indicating the direction of the antenna 25 by detecting the variation amount (e.g., variation angle) of the direction with respect to a direction as a reference, with the sensor 23.

The output value is the intensity of the output signals (e.g., radio waves) output from the antenna 25 if the RFID tag is read. The output value is set according to the instruction from the processor 21 by the output setting circuit 46 of the communication control circuit 24. The processor 21 specifies the output value set in the communication control circuit 24.

The RSSI value is information indicating the intensity of the reception signal received from each RFID tag. The RSSI value is detected by the level detection circuit 47 from the reception signal of each RFID tag. The processor 21 acquires the RSSI value that is detected by the level detection circuit 47.

If the reading result of each RFID tag in the reading area is acquired, the processor 21 measures (e.g., detects) a swing amount that is the change amount of the direction of the antenna 25 (ACT 12). The processor 21 measures (e.g., detects) the swing amount based on the variation amount of the direction detected by the sensor 23. For example, the processor 21 measures the swing amount by the variation amount (e.g., difference) between the direction if the RFID tag is read and the direction before predetermined time. In addition, the processor 21 may measure a swing amount by the difference (e.g., variation amount) between the direction if the search starts and the direction if the RFID tag is read. In addition, the processor 21 may measure the swing amount by the difference between the direction if the RFID tag is read and the direction if the RFID tag is read right before.

After the swing amount is measured, the processor 21 determines whether the RFID tag as the search target has been read (ACT 13). If the RFID tag as the search target has not been read (ACT 13, NO), the processor 21 proceeds to ACT 19 described below.

If the RFID tag as the search target is read (ACT 13, YES), the processor 21 estimates the direction (e.g., tag direction) where the RFID tag as the search target is present (ACT 14). The example of the process of estimating the tag direction is described below. However, the processes may be performed with the process of estimating the tag direction of ACT 15 omitted.

If the tag direction is estimated, the processor 21 stores the reading result of the RFID tag as the search target including the estimating result of the tag direction in the memory 22 (ACT 15). Accordingly, the reading results of the RFID tag as the search target are accumulated in the memory 22.

If the reading result of the RFID tag as the search target is stored, the processor 21 determines whether the communication state with the RFID tag as the search target exceeds the reference level (ACT 16). For example, the processor 21 determines whether the RSSI value of the reception signal from the RFID tag as the search target exceeds the reference level, as the communication state. Here, the processor 21 may set the reference level to be compared with the communication state according to the output value set in the communication control circuit 24.

If the communication state exceeds the reference level (ACT 16, YES), the processor 21 determines whether the output value (e.g., the magnitude of the output signal) of the transmission signal set in the communication control circuit 24 is a minimum value that can be set (ACT 17).

If the output value of the transmission signal is not the minimum value (ACT 17, YES), the processor 21 reduces the output value of the output signal set in the communication control circuit 24 (ACT 18).

Here, the processor 21 stepwisely reduces the output value until the value becomes the minimum value that can be set. If the output value is reduced, the reading area of the RFID tag by the wireless tag reading device 10 is reduced. That is, the processor 21 stepwise limits the reading area where the RFID tag as the search target has been read by stepwise reducing the output value. Accordingly, the wireless tag reading device 10 can limitedly specify the position where the RFID tag as the search target is present.

If the output value of the transmission signal is the minimum value (ACT 17, NO), the processor 21 notifies the detection result of the RFID tag as the search target (ACT 22). For example, the processor 21 displays the information indicating the position of the RFID tag as the search target which is estimated from the reading result at the minimum output value on the display device 114. In addition, the processor 21 may notify the host device 11 of the information indicating the detection result of the RFID tag as the search target by the communication interface 26.

The processor 21 sets the reference value as the threshold value with respect to the swing amount according to the reading condition of the RFID tag, the estimating result of the tag direction, the output value, the estimated distance to the RFID tag, and the like (ACT 19).

For example, if the RFID tag as the search target is not read (ACT 13, NO), the processor 21 sets the predetermined reference value with respect to the swing amount for reading the wide area (ACT 19).

In addition, if the tag direction is estimated, the processor 21 sets the reference value of the swing amount based on the estimated tag direction. For example, if the communication state is the reference level or less (ACT 16, NO), or the output value of the transmission signal is reduced, the processor 21 sets the reference value of the swing amount based on the estimated tag direction.

Further, the processor 21 may set the reference value with respect to the swing amount according to various conditions. As a specific example, the processor 21 may set the reference value according to the output value of the transmission signal set in the communication control circuit 24. For example, the processor 21 reduces the reference value with respect to swing amount as the output value of the transmission signal is reduced. In addition, the processor 21 may set the reference value according to the distance to the RFID tag estimated from the RSSI value or the like. For example, the processor 21 reduces the reference value as the distance to the RFID tag is closer.

After the reference value with respect to the swing amount is set, the processor 21 determines whether the measured swing amount is less than the set reference value (ACT 20). If the swing amount is equal to or more than the reference value (ACT 20, NO), the processor 21 returns to ACT 11 and performs the processes described above again.

If the swing amount is less than the reference value (ACT 20, YES), the processor 21 outputs the alert for prompting the operator to perform the operation of increasing the swing amount (ACT 21). For example, the processor 21 displays the operation guidance as illustrated in the display field 241 of FIG. 3 on the display device 114 as the alert. In addition, as the alert, a sound such as an alarm or voice guidance may be output from a speaker or the like included in the information terminal 28. The alert may prompt the operator to perform the operation of changing the direction of the antenna 25 as significantly as the reference value or more.

As described above, if the swing amount indicating the change amount of the direction of the antenna is the reference value or less, the wireless tag reading device notifies the alert prompting the operation of changing the direction of the antenna. Accordingly, the operator who operates the wireless tag reading device can appropriately perform the operation of changing the direction of the antenna for an efficient search for the RFID tag.

In addition, the wireless tag reading device sets the reference value with respect to the swing amount indicating the change amount of the direction of the antenna according to the condition. If the swing amount is less than the reference value set according to the condition, the wireless tag reading device notifies the operator of the alert prompting the operation of changing the direction of the antenna. Accordingly, the wireless tag reading device can notify the operator of the alert efficiently enabling the search for the RFID tag as the search target according to the condition.

Subsequently, a second operation example of the wireless tag reading device 10 according to the embodiment is described.

Figure 5:
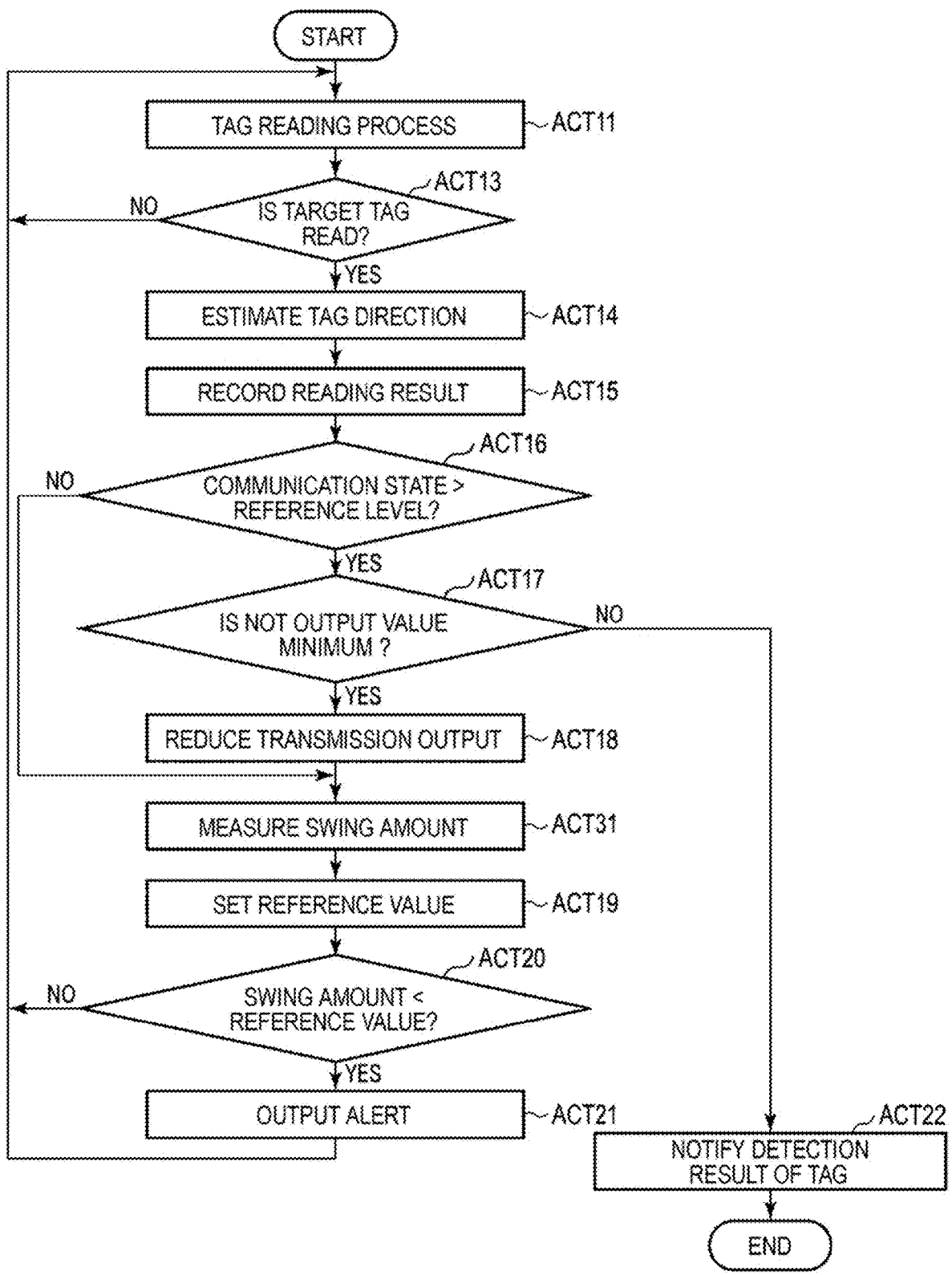
FIG. 5 is a flowchart illustrating a second operation example for the wireless tag reading device.

FIG. 5 is a flowchart illustrating the second operation example of the wireless tag reading device 10 according to the embodiment.

The second operation example is different from the first operation example described above in that the swing amount is measured after the RFID tag as the search target is read. Each process of ACTS 11 to 22 illustrated in FIG. 5 may be the same as each process of ACTS 11 to 22 illustrated in FIG. 4 described as the first operation example, and thus detailed description is omitted.

The processor 21 of the wireless tag reading device 10 performs the RFID tag reading process in response to the instruction of the search start by the operator (ACT 11). If the reading result of each RFID tag in the reading area is acquired, the processor 21 determines whether the RFID tag as the search target has been read (ACT 13). If the RFID tag as the search target has not been read (ACT 13, NO), the processor 21 returns to ACT 11 and reads the RFID tag, again.

If the RFID tag as the search target is read (ACT 13, YES), the processor 21 estimates the direction (tag direction) where the RFID tag as the search target is present (ACT 14). If the tag direction is estimated, the processor 21 stores the reading result of the RFID tag as the search target including the estimating result of the tag direction in the memory 22 (ACT 15).

After the reading result of the RFID tag as the search target is stored, the processor 21 determines whether the communication state with the RFID tag as the search target exceeds the reference level (ACT 16). If the communication state exceeds the reference level (ACT 16, YES), the processor 21 determines whether the output value of the transmission signal set in the communication control circuit 24 is the minimum value that can be set (ACT 17).

If the output value is the minimum value (ACT 17, NO), the processor 21 notifies the detection result of the RFID tag as the search target (ACT 22).

If the output value is not the minimum value (ACT 17, YES), the processor 21 reduces the output value of the transmission signal set in the communication control circuit 24 (ACT 18).

If the output value is reduced, or the communication state is the reference level or less (ACT 16, NO), the processor 21 measures (e.g., detects) the swing amount that is the change amount of the direction of the antenna 25 (ACT 31). In the same manner as in ACT 12 described above, the processor 21 measures (e.g., detects) the swing amount based on the variation amount of the direction (e.g., reading direction) detected by the sensor 23. However, in the second operation example, the processor 21 measures the swing amount with respect to the estimated tag direction.

After the swing amount is measured, the processor 21 sets the reference value as the threshold value with respect to the swing amount (ACT 19). In the second operation example, the processor 21 sets the reference value with respect to the estimated tag direction. In addition, the processor 21 sets the reference value according to the output value of the transmission signal set in the communication control circuit 24. Further, the processor 21 may set the reference value in consideration of the estimated distance to the RFID tag as the search target.

As the reference value with respect to the swing amount is set, the processor 21 determines whether the measured swing amount is less than the set reference value (ACT 20). In the second operation example, the reference value with respect to the tag direction is set. Therefore, the processor 21 determines whether the swing amount with respect to the tag direction is equal to or more than the reference value.

If the swing amount is less than the reference value (ACT 20, YES), the processor 21 outputs the alert for prompting the operation of increasing the swing amount with respect to the tag direction (ACT 21).

If the swing amount is equal to or more than the reference value (ACT 20, NO), the processor 21 returns to ACT 11 and performs the process described above again.

According to the second operation example as above, the wireless tag reading device estimates the tag direction where the RFID tag as the search target is present if the RFID tag as the search target can be read. The wireless tag reading device measures the swing amount indicating the change amount of the direction of the antenna with respect to the tag direction. The wireless tag reading device outputs the alert of prompting the increase of the swing amount with respect to the tag direction if the swing amount is less than the reference value with respect to the tag direction.

Accordingly, according to the second operation example, it is possible to prompt the operator to perform the operation of causing the swing amount with respect to the tag direction of the RFID tag as the search target to be equal to or more than the reference value. As a result, the wireless tag reading device can efficiently search for the RFID tag as the search target by the operation by the operator in response to the alert.

Subsequently, a third operation example of the wireless tag reading device 10 according to the embodiment is described.

Figure 6:
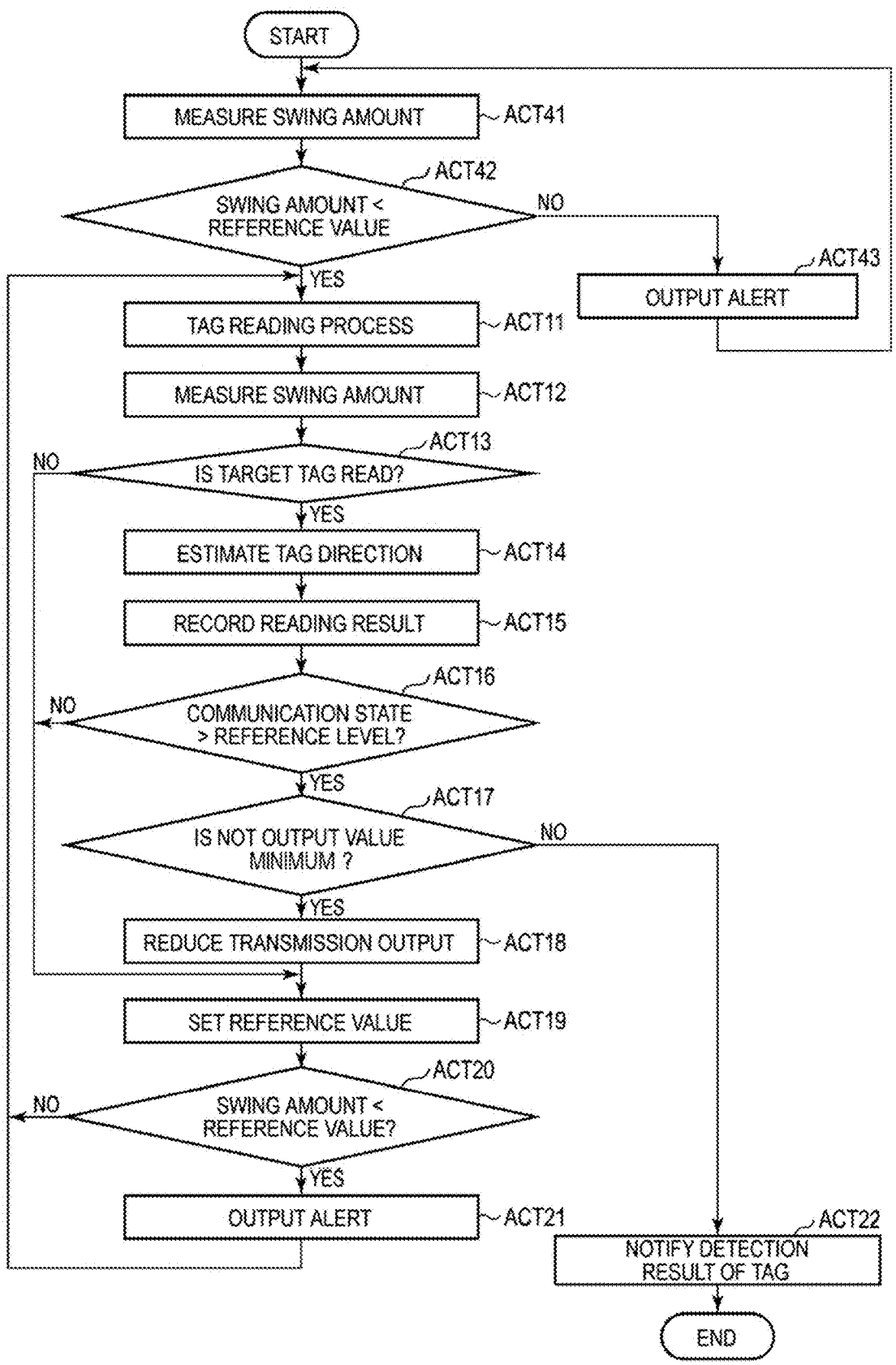
FIG. 6 is a flowchart illustrating a third operation example for the wireless tag reading device.

FIG. 6 is a flowchart illustrating the third operation example of the wireless tag reading device 10 according to the embodiment.

The third operation example is different from the first operation example described above in that the reading of the RFID tag starts if the swing amount is equal to or more than the reference value. Each process of ACTS 11 to 22 illustrated in FIG. 6 may be the same as each process of ACTS 11 to 22 illustrated in FIG. 4 as the first operation example, and thus detailed description thereof is omitted.

In the third operation example, the processor 21 of the wireless tag reading device 10 measures the swing amount indicating the variation amount of the direction of the antenna after the RFID tag as the search target is set (ACT 41). If the swing amount is measured, the processor 21 determines whether the measured swing amount is equal to or more than the reference value (the reference value of the search start) for starting the search (ACT 42).

If the swing amount is less than the reference value for the search start (ACT 42, NO), the processor 21 outputs the alert for prompting the operation of increasing the variation amount of the direction of the antenna (ACT 43). For example, the processor 21 displays the operation guidance for prompting the operation of shaking the reader device 120 left and right on the display device 114.

If the swing amount is the reference value for the search start or more (ACT 42, YES), the processor 21 starts the RFID tag reading process and performs the operation of ACTS 11 to 22 described in the first operation example.

Subsequently, a fourth operation example of the wireless tag reading device 10 according to the embodiment is described.

Figure 7:
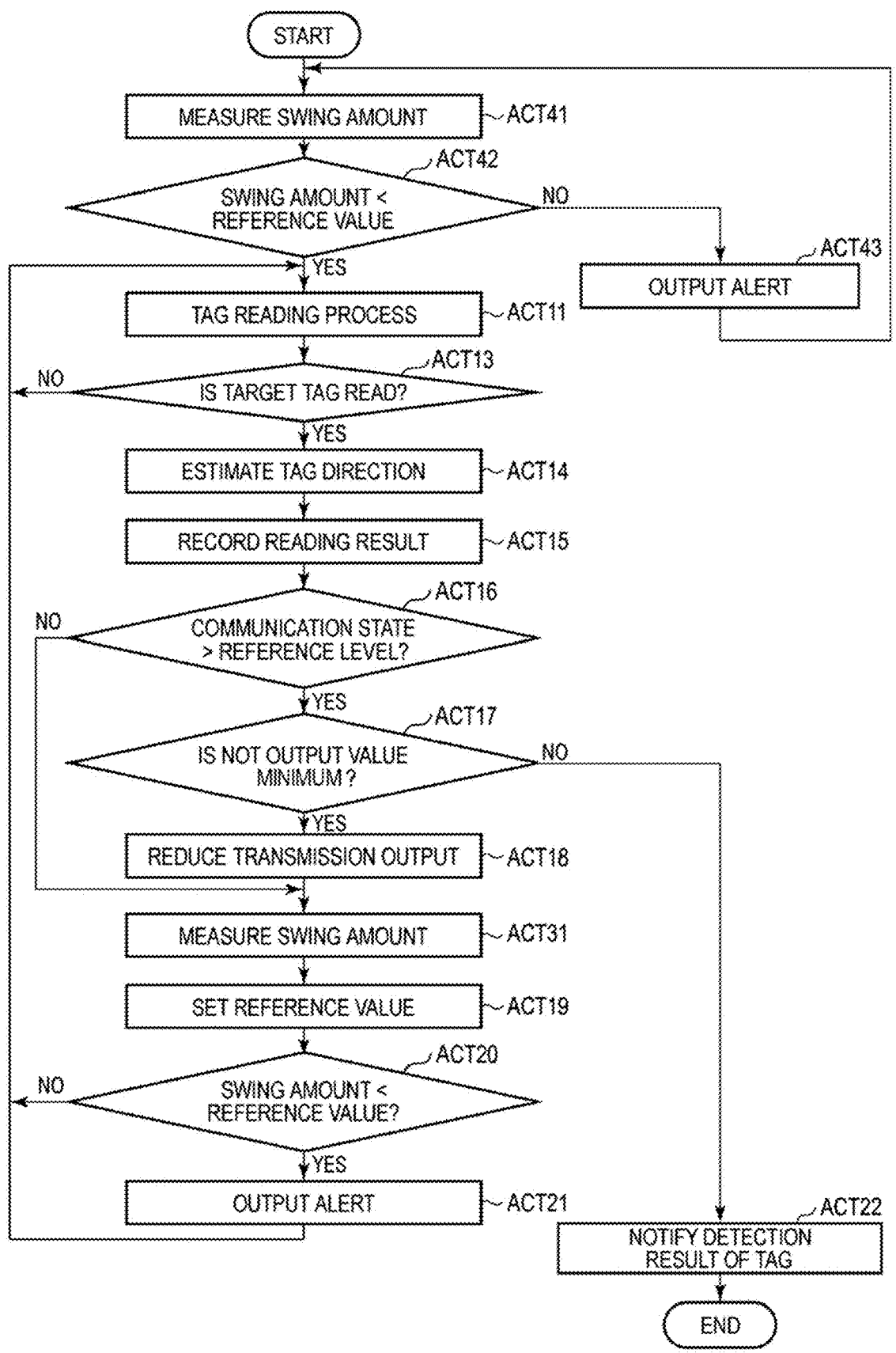
FIG. 7 is a flowchart illustrating a fourth operation example for the wireless tag reading device.

FIG. 7 is a flowchart illustrating the fourth operation example of the wireless tag reading device 10 according to the embodiment.

The fourth operation example is different from the second operation example described above in that the reading of the RFID tag is started if the swing amount is the reference value for the search start or more. Each process of ACTS 11 to 22 illustrated in FIG. 6 may be the same as each process of ACTS 11 to 22 in FIG. 5 described in the first and second operation examples and thus the detailed description thereof is omitted.

In the fourth operation example, the processor 21 of the wireless tag reading device 10 measures the swing amount indicating the variation amount of the direction of the antenna after the RFID tag as the search target is set (ACT 41). If the swing amount is measured, the processor 21 determines whether the measured swing amount is equal to or more than the reference value (the reference value of the search start) for starting the search (ACT 42).

If the swing amount is less than the reference value for the search start (ACT 42, NO), the processor 21 outputs the alert of prompting the operation of increasing the variation amount of the direction of the antenna (ACT 43). For example, the processor 21 displays the operation guidance of prompting the operation of shaking the reader device 120 left and right on the display device 114.

If the swing amount is the reference value for the search start or more (ACT 42, YES), the processor 21 starts the RFID tag reading process and performs the operations of ACTS 11 to 22 and 31 described in the second operation example.

According to the third and fourth operation examples as above, the wireless tag reading device starts to read the RFID tag after the confirmation of the swing amount that is equal to or more than the predetermined reference value. If the swing amount is less than the reference value for the search start, the wireless tag reading device outputs the alert for prompting the operation of increasing the swing amount indicating the change amount of the direction of the antenna.

Accordingly, the wireless tag reading device can output the alert for prompting the increase of the swing amount, while the swing amount is small. In addition, the wireless tag reading device can start to read the RFID tag after the swing amount becomes equal to or more than the predetermined reference value. As a result, the wireless tag reading device can prompt the operation of definitely causing the swing amount to be equal to or more than the reference value, if the search of the RFID tag is started.

Subsequently, the process of estimating the tag direction where the RFID tag as the search target is present by the wireless tag reading device 10 according to the embodiment is described.

Figure 8:
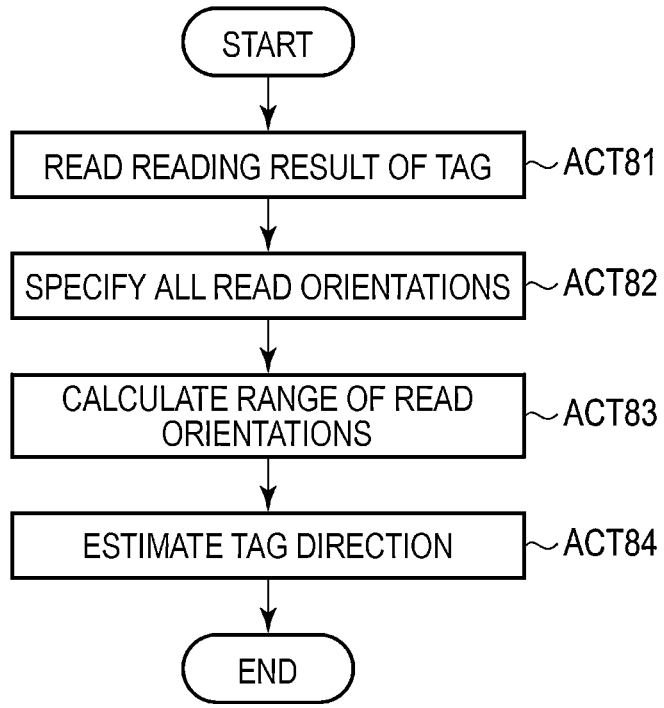
FIG. 8 is a flowchart illustrating a first operation example of a process of estimating a tag direction by the wireless tag reading device.

FIG. 8 is a flowchart illustrating a first operation example of a process of estimating the tag direction by the wireless tag reading device 10 according to the embodiment.

The processor 21 of the wireless tag reading device 10 reads the reading result of the RFID tag as the search target stored in the memory 22 (ACT 81). Information indicating the direction if the corresponding RFID tag is read is included in the reading result of the RFID tag stored in the memory 22. The direction if the RFID tag as the search target is read is detected by the sensor 23.

The processor 21 specifies all the directions if the RFID tag as the search target is read (ACT 82). The processor 21 calculates ranges of all the directions where the RFID tag as the search target is read (ACT 83). The processor 21 estimates the center of the ranges of the directions as the tag direction (ACT 84).

Figure 9:
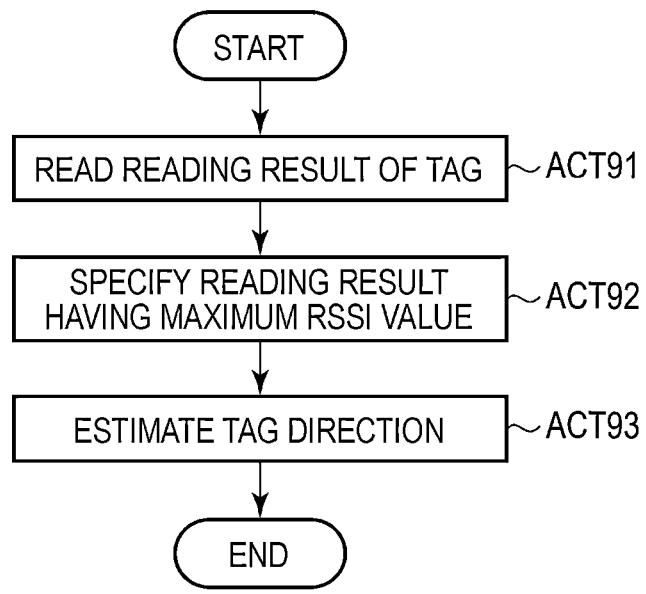
FIG. 9 is a flowchart illustrating a second operation example of the process of estimating a tag direction by the wireless tag reading device.

FIG. 9 is a flowchart illustrating the second operation example of the process of estimating the tag direction by the wireless tag reading device 10 according to the embodiment.

The processor 21 of the wireless tag reading device 10 reads the reading result of the RFID tag as the search target stored in the memory 22 (ACT 91). The RSSI value indicating the intensity of the reception signal if the corresponding RFID tag is read is included in the reading result of the RFID tag stored in the memory 22. The information indicating the direction if the corresponding RFID tag is read and the RSSI value indicating the intensity of the reception signal are included in the reading result of the RFID tag stored in the memory 22.

The processor 21 specifies the reading result in which the RSSI value is maximum from the reading results of the RFID tag as the search target (ACT 92). The processor 21 estimates the direction if the RSSI value is the maximum as the tag direction based on the reading result in which the RSSI value is the maximum (ACT 84).

As above, the wireless tag reading device according to the embodiment includes the communication interface, the sensor, and the processor. The communication interface communicates with the RFID tag via the antenna. The sensor detects the swing amount indicating the variation amount of the direction of the antenna. The processor causes the device such as the display device to output the alert for prompting the increase of the swing amount if the swing amount detected by the sensor is less than the predetermined reference value. Accordingly, the wireless tag reading device according to the embodiment can prompt the operation of causing the variation amount of the direction of the antenna to be the variation amount equal to or more than the reference value.

Further, in the wireless tag reading device according to the embodiment, the processor estimates the tag direction where the RFID tag read by the communication interface is present. The processor measures the swing amount with respect to the tag direction estimated if the tag information of the RFID tag as the search target is read. The processor outputs the alert if the swing amount with respect to the tag direction is less than the reference value. Accordingly, the wireless tag reading device according to the embodiment can prompt the operation so that the variation amount of the direction of the antenna with respect to the direction where the tag is estimated to be present is equal to or more than the reference value.

In addition, in the wireless tag reading device according to the embodiment, the processor sets the reference value with respect to the swing amount according to the output value of the transmission signal transmitted to the RFID tag. Accordingly, the wireless tag reading device can prompt the operation with the proper swing amount according to the output value of the transmission signal.

In addition, in the wireless tag reading device according to the embodiment, the processor estimates the distance to the RFID tag as the search target. The processor can set the reference value with respect to the swing amount according to the distance to the RFID tag. Accordingly, the wireless tag reading device can prompt the operation with the proper swing amount according to the estimated distance to the RFID tag as the search target.

In addition, according to the embodiment described above, a case where the program executed by the processor is stored in advance in the memory in the device is described. However, the program executed by the processor may be downloaded from the network to the device or may be installed from the storage medium to the device. As the storage medium, a storage medium that can store programs such as CD-ROM and that can be read by the device may be used. In addition, functions obtained by installation or download in advance may be implemented in cooperation with an operating system (OS) or the like inside the device.

In addition, according to the embodiment described above, the operation of causing the processor 21 to perform a search process is described. However, the processor 111 of the information terminal 28 may transmit the command to the processor 21 so that the processor 111 may be the main body of the operation to perform the search process.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A wireless tag communication device comprising:
   a communication control circuit configured to communicate with a wireless tag via an antenna;
   a sensor configured to detect a variation amount of a direction of the antenna; and
   a processor configured to:
   specify and calculate ranges of a plurality of directions of a specific wireless tag read by the communication control circuit;
   estimate a tag direction where the specific wireless tag is present as a center of the ranges when tag information of a specific wireless tag is read by the communication control circuit; and
   output an alert when the variation amount of the direction of the antenna with respect to the estimated tag direction is less than a reference value.

2. The device according to claim 1, wherein
   when the variation amount of the direction of the antenna is more than or equal to the reference value, the processor is configured to start to read the wireless tag by the communication control circuit.

3. The device according to claim 1, wherein:
   the communication control circuit is configured to provide a received signal strength indicator for each time the specific wireless tag is read by the communication control circuit, and
   the processor is configured to estimate the estimated tag direction as the tag direction in which the received signal strength indicator is highest.

4. The device according to claim 1, wherein
   the processor is configured to set the reference value in accordance with an output value of a transmission signal output via the antenna by the communication control circuit.

5. The device according to claim 1, wherein
   the processor is configured to reduce an output value of a transmission signal output via the antenna by the communication control circuit to a minimum value that is settable.

6. The device according to claim 1, wherein
   when tag information of a specific wireless tag is read by the communication control circuit, the processor is configured to estimate a distance to the specific wireless tag and to set the reference value in accordance with the estimated distance.

7. The device according to claim 1, wherein
   the sensor is configured to detect the variation amount of the direction of the antenna after the communication control circuit communicates with the wireless tag via the antenna.

8. The device according to claim 2, wherein
   the sensor is configured to detect the variation amount of the direction of the antenna after the communication control circuit communicates with the wireless tag via the antenna.

9. A method of guiding a user of a wireless tag communication device, the method comprising:
   communicating, by a communication control circuit, with a wireless tag via an antenna;
   detecting, by a sensor, a variation amount of a direction of the antenna;
   specifying and calculating, by a processor, ranges of a plurality of directions of a specific wireless tag read by the communication control circuit;
   estimating, by the processor, a tag direction where the specific wireless tag is present as a center of the ranges, when tag information of the specific wireless tag is read by the communication control circuit; and
   outputting, by the processor, an alert when the variation amount of the direction of the antenna detected by the sensor with respect to the estimated tag direction is less than a reference value.

10. The method according to claim 9, further comprising
    starting, by the processor, to read the wireless tag by the communication control circuit, when the variation amount of the direction of the antenna is more than or equal to the reference value.

11. The method according to claim 9, further comprising
    providing, by the communication control circuit, a received signal strength indicator for each time the specific wireless tag is read by the communication control circuit, and
    estimating, by the processor, the estimated tag direction as the tag direction in which the received signal strength indicator is highest.

12. The method according to claim 9, further comprising setting, by the processor, the reference value in accordance with an output value of a transmission signal output via the antenna by the communication control circuit.

13. The method according to claim 9, further comprising reducing, by the processor, an output value of a transmission signal output via the antenna by the communication control circuit to a minimum value that is settable.

14. The method according to claim 9, further comprising estimating, by the processor, a distance to a specific wireless tag and to set the reference value in accordance with the estimated distance, when tag information of the specific wireless tag is read by the communication control circuit.

15. The method according to claim 9, further comprising detecting, by the sensor, the variation amount of the direction of the antenna after the communication control circuit communicates with the wireless tag via the antenna.

16. The method according to claim 10, further comprising detecting, by the sensor, the variation amount of the direction of the antenna after the communication control circuit communicates with the wireless tag via the antenna.

* * * * *